United States Patent [19]
Leomand

[11] 3,910,531
[45] Oct. 7, 1975

[54] SHELL-TYPE STRUCTURE FOR LIGHT AIRCRAFT

[75] Inventor: Gerard Leomand, Chaville, France

[73] Assignee: Societe Nationale Industrielle Aerospatiale, Paris, France

[22] Filed: Oct. 16, 1973

[21] Appl. No.: 406,840

[30] Foreign Application Priority Data
Oct. 17, 1972 France .............................. 72.36756
Aug. 8, 1973 France .............................. 73.28582

[52] U.S. Cl. ................................ 244/119; 244/123
[51] Int. Cl.² ......................................... B64C 1/00
[58] Field of Search ........... 244/119, 120, 123, 126, 244/105; 161/68, 102, 36; 9/6; 156/245, 197

[56] References Cited
UNITED STATES PATENTS

| | | | |
|---|---|---|---|
| 2,482,798 | 9/1949 | Rheinfrank, Jr. et al. .......... | 244/123 |
| 2,630,868 | 3/1953 | Ellenberger ..................... | 156/245 X |
| 2,693,922 | 11/1954 | Ellison et al. ..................... | 244/123 |
| 2,925,231 | 2/1960 | Pfaff, Jr. et al. ................. | 161/68 UX |
| 3,021,246 | 2/1962 | Hütter et al. ..................... | 156/245 X |
| 3,063,398 | 11/1962 | Yohe ............................... | 244/105 X |
| 3,078,202 | 2/1963 | Bellanca et al. ..................... | 9/6 X |
| 3,097,982 | 7/1963 | Stoner ............................. | 156/197 UX |
| 3,119,333 | 1/1964 | Loughran ......................... | 244/119 X |
| 3,123,907 | 3/1964 | Thomas ............................ | 156/197 UX |
| 3,145,000 | 8/1964 | Mackie ............................ | 244/123 |
| 3,155,348 | 11/1964 | Ricard ............................. | 244/119 |
| 3,217,807 | 11/1965 | Underhill, Jr. et al. .......... | 244/123 X |
| 3,519,228 | 7/1970 | Windecker ....................... | 244/123 |
| 3,780,969 | 12/1973 | Nussbaum et al. .................. | 244/123 |

Primary Examiner—Trygve M. Blix
Assistant Examiner—Paul E. Sauberer
Attorney, Agent, or Firm—Karl W. Flocks

[57] ABSTRACT

Main sandwich-type shell structure for light aircraft comprising a moulded structure assembly of cellular-core panels and conventionnal structural members, the panels being joined to the structural members by resin bonding through the agency of lugs provided by skin overlengths of the panels.

3 Claims, 13 Drawing Figures

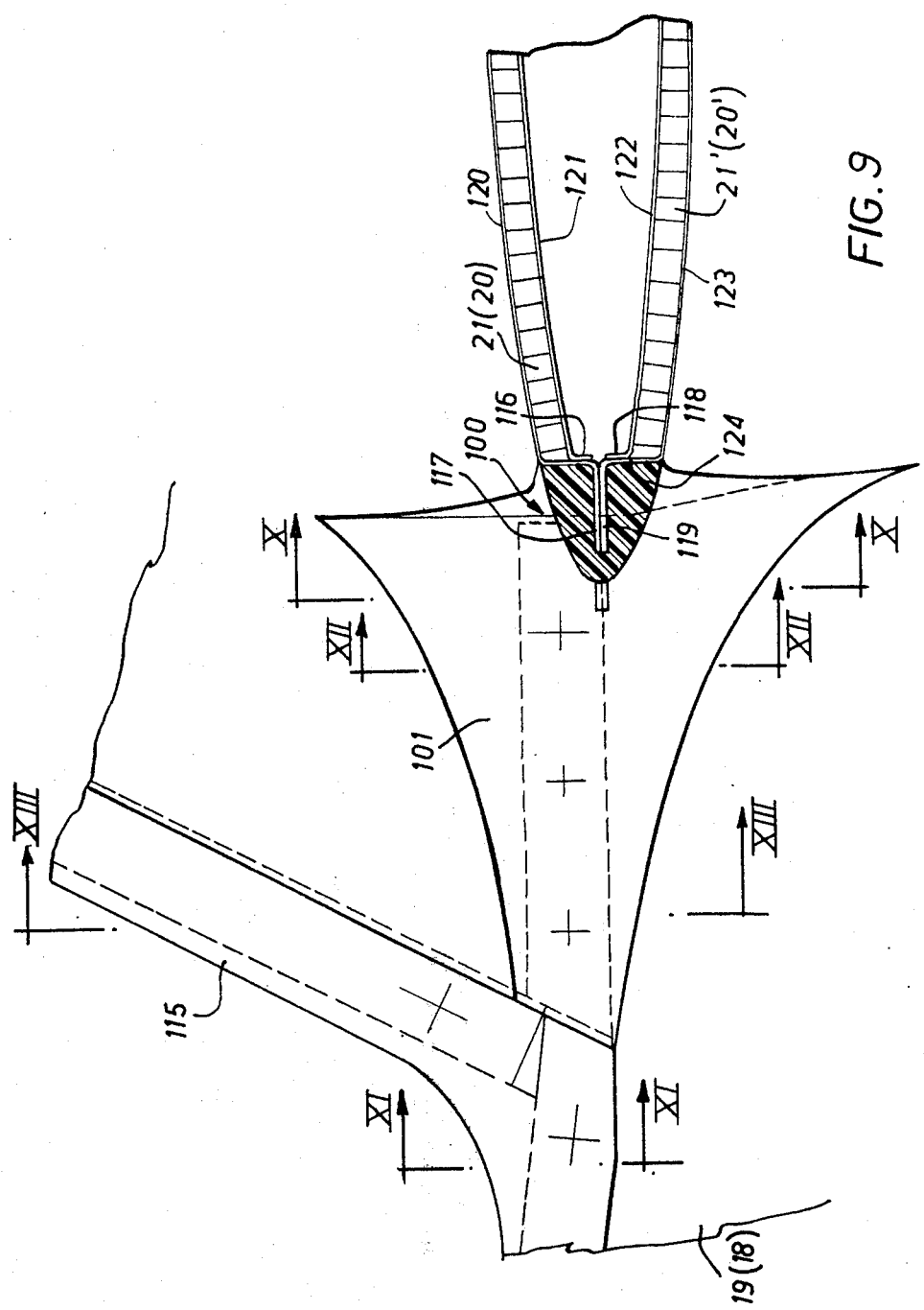

SHELL-TYPE STRUCTURE FOR LIGHT AIRCRAFT

This invention relates to a sandwich type shell structure for light aircraft and more particularly to a moulded structure characterized by an assembly of cellular-core panels (hereinafter referred to as sandwich panels) and structural members, the panels being joined to the structural members by resin bonding through the agency of lugs provided by skin overlengths.

Best known are two kinds of light aircraft structures, namely truss structures with unstressed skins, as used for fabric-covered aircraft, in which the loads are withstood at stress concentration points, and structures employing a thin metallic core, in which the skin is stressed in shear and in which a large number of transverse struts withstand buckling loads, the latter type of structure being used for the majority of light utility aircraft currently built around the world.

Both these kinds of structures are ill-suited to the latest sandwich materials because the composite plastic materials used have only a modest specific shear strength by comparision with their other strength characteristics; another reason is that, because they are moulded, both the dimensions and the functions of each elemental component must be augmented.

These are the reasons why attempts to adapt composite sandwich techniques to conventional structures have heretofore resulted in weight breakdowns and cost estimates which compare unfavourably with those customarily obtained with conventional fabrication techniques.

Yet it is generally recognized that shell structures, in which the skin absorbs normal loads as well as being stressed in shear, constitute the ideal type of structure because they require only a small number of easy-to-produce moulded component parts. On the other hand, it is recognized that difficulties are encountered in defining the means for joining the elemental panels and in incorporating in the structure the elements needed to ensure proper application of such normal and shear loads. Thus French patent No. 857.265 (Caudron), which as early as in 1939 proposed a stressed composite panel comprising at least one metallic sheet, failed on the other hand to describe integrated stress-introducing means to permit practical applications of such a panel.

In metallic structures, stress concentrations are obtained simply by means of attachment fittings.

In sandwich shell structures, the problem is complicated by the low shear strength of the plastics used. For this reason the junction flanges must have a much larger area for better load distribution, or else the elemental parts (panels and members) must have more complex shapes (whilst permitting multiple functions) in order to produce a deconcentration of the load inputs.

Thus for a sandwich-type shell structure, the essential structural joints must be reduced to the skin-wingspar and skin-rib joints in the case of the wings and to the joint between the two half-shells in the case of the fuselage.

It is therefore a prime object of this invention to provide attachment methods adapted to the different component parts of a light monobloc aircraft having a plastic sandwich-type shell structure and a wing leading edge made of expanded foam bonded to the joint between the top and bottom wing surfaces, such combination being simple to obtain, effective against icing under certain conditions, and easy to repair in the event of damage.

The invention further relates to a moulded sandwich-structure composite element consisting of a top skin panel and bottom skin panel for the aft horizontal stabilizer of a light aircraft, said composite element comprising, along the leading edge of the stabilizer, a first angled lug formed by two overlengths of the top panel skins, a second angled lug formed by two overlengths of the bottom-panel skins, the ends of these two lugs being bonded together, and a profiled edging comprising a straight portion placed astride these two ends and bonded thereto as well as to the adjacent portions of the top and bottom panels, and an element fast with said straight portion and disposed vertically at one end and on either side thereof, said element being adapted to be bonded against the vertical stabilizer and the fuselage in order to form a fillet to prevent the formation of vortices at the junction between the fuselage and the horizontal stabilizer.

The invention likewise relates to a composite structural element consisting of two vertical-stabilizer halves positioned symmetrically in relation to the longitudinal symmetry plane of a light aircraft, said composite element comprising, along the leading edge of said vertical stabilizer, a first angled lug formed by two overlengths of the skins of one half of such stabilizer, a second angled lug formed by two overlengths of the skins of the other half of such stabilizer, the ends of these two lugs being bonded together, and a profiled edging placed astride said two ends and bonded thereto as well as to the adjacent fuselage portion coextensive with said leading edge in order to prevent the formation of vortices.

The description which follows with reference to the accompanying non-limitative exemplary drawings will give a clear understanding of how the invention can be carried into practice.

In the drawings:

FIG. 9 is a sectional view through the left half of the rear horizontal stabilizer of such aircraft, showing the corresponding profiled edging.

Figure 1:
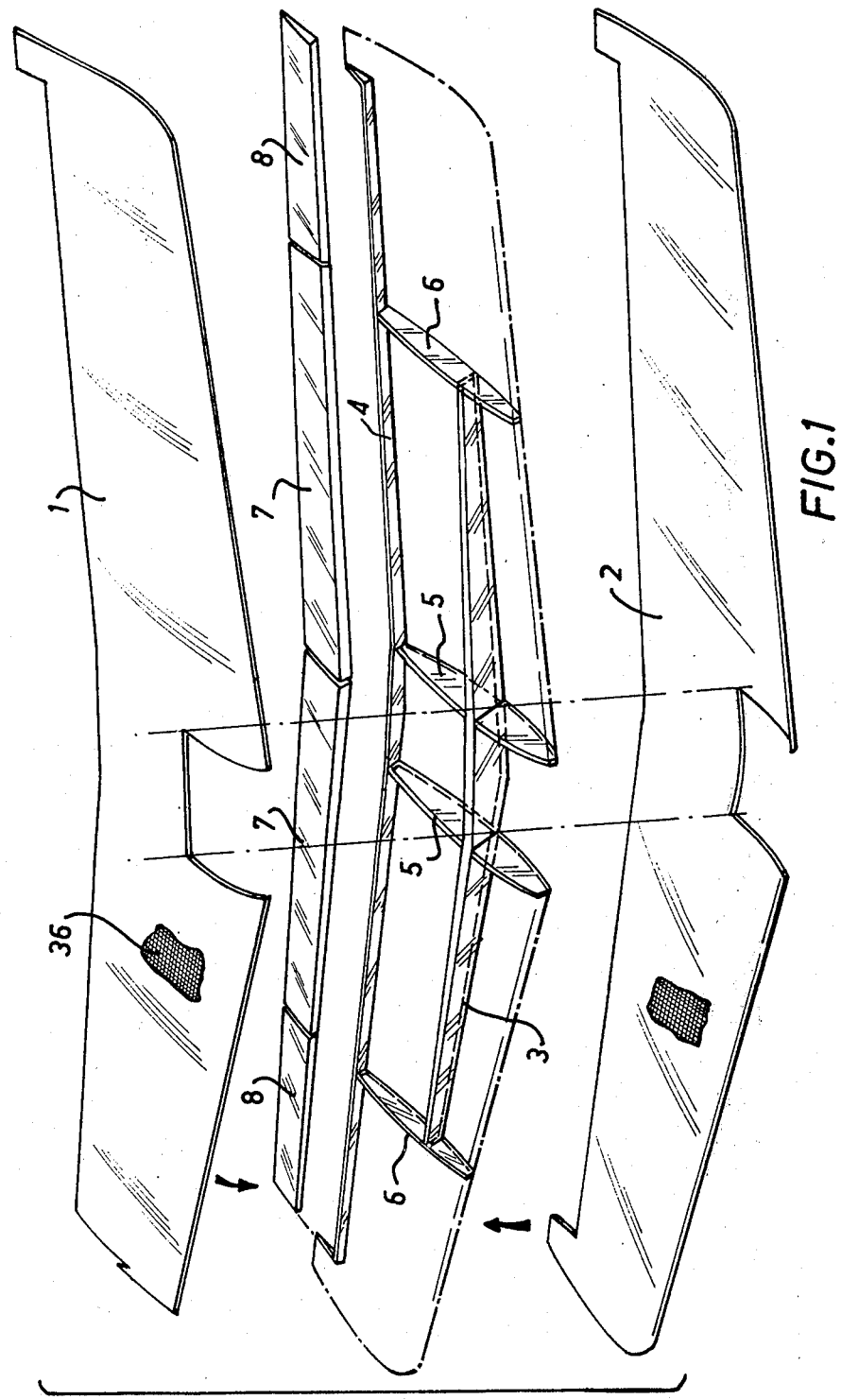
FIG. 1 is an exploded illustration in perspective of a light aircraft wing according to this invention.

Reference is first had to FIG. 1 for a showing of a sandwich shell-type wing structure according to the invention, basically comprising a top panel 1, a bottom panel 2 and a framework consisting of a front stub spar 3, a rear spar 4, two inboard ribs 5, two outboard ribs 6, two flaps 7 and two ailerons 8 being accommodated in the aft portion of the trailing edge of the wing. Top panel 1 (FIG. 2) includes an inner skin 9, an outer skin 10 and a honeycomb core 11. Similarly, bottom panel 2 includes an outer skin 12, an inner skin 13 and a honeycomb core 14.

Spars 3 and 4 and ribs 5 and 6 (FIG. 1) are likewise formed of lateral skins (such as skins 15 and 16) and a honeycomb core (such as core 17).

Figure 3:
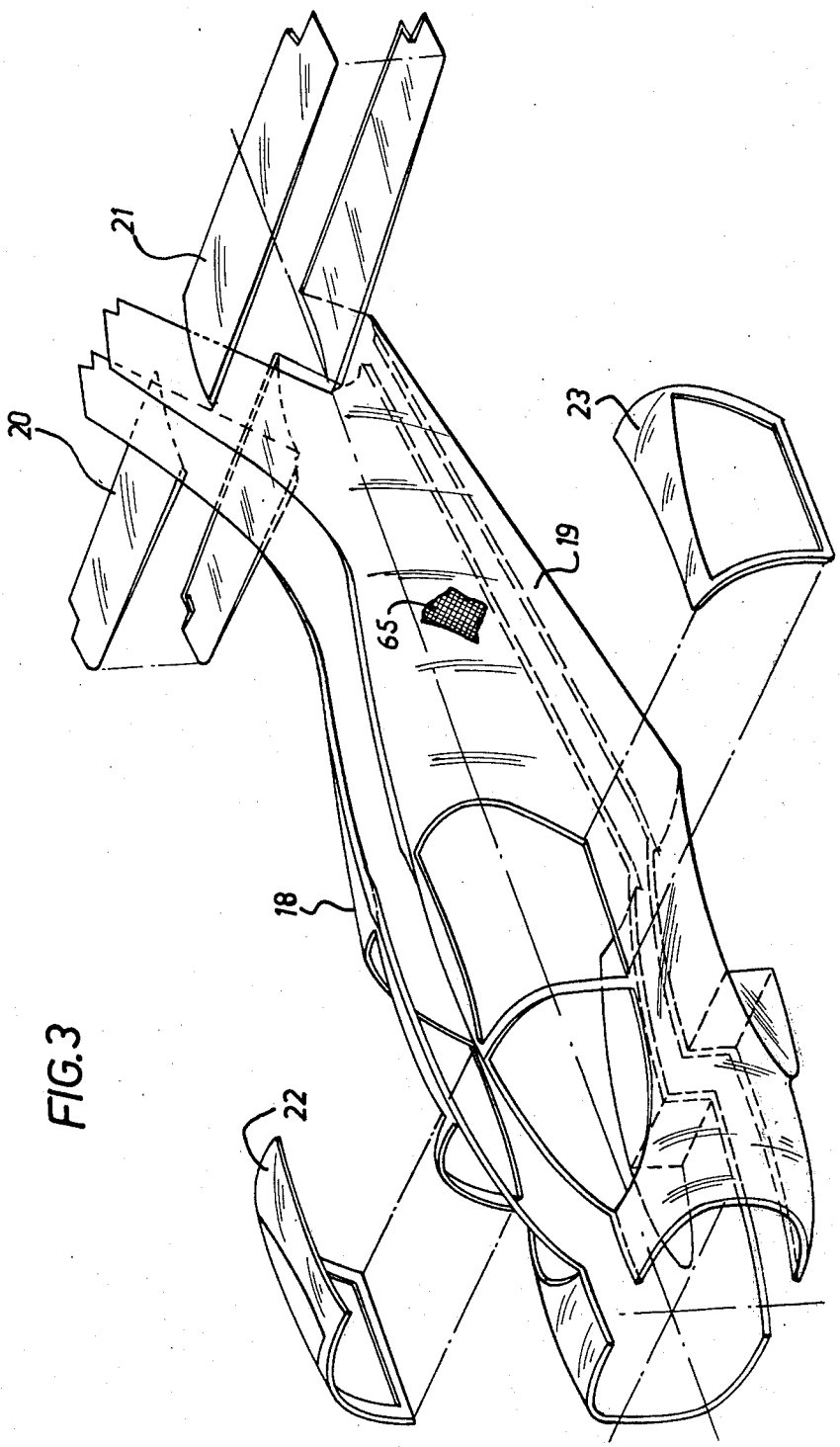
FIG. 3 is an exploded illustration in perspective of a light aircraft fuselage according to this invention.

The fuselage, an exploded view of the elements of which is provided by FIG. 3, is a sandwich-type shell structure. In accordance with the present invention, it includes basically the right-hand fuselage half-shell 18, the left-hand fuselage half-shell 19, the right-hand aft half-element 20, the left-hand aft half-element 21 and, by way of accessories, the right-hand and left-hand doors 22 and 23.

Figure 5:
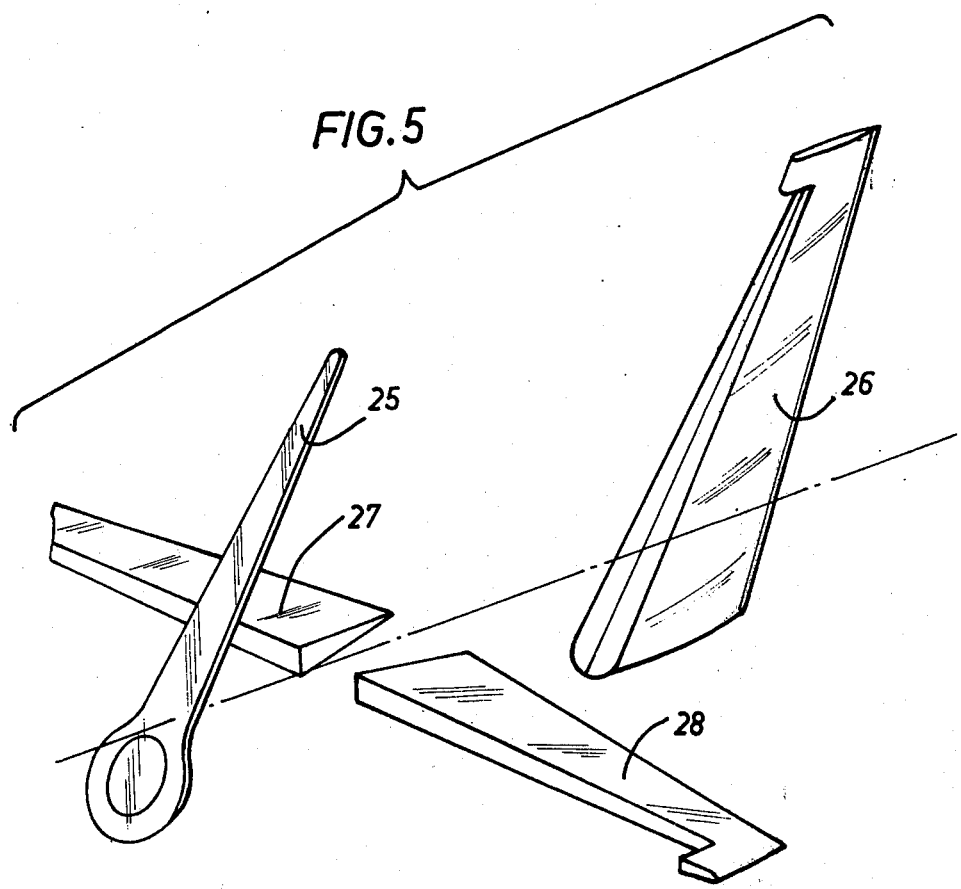
FIG. 5 is an exploded view of the aft portion of such light aircraft.

The aft portion, an exploded view of the elements of which is provided by FIG. 5, basically includes a rear frame 25 integrated into the aft half-elements 20 and 21, a rudder 26 and starboard and port elevators 27 and 28 being provided at the extreme aft portions of the fuselage in conventional fashion.

Figure 4:
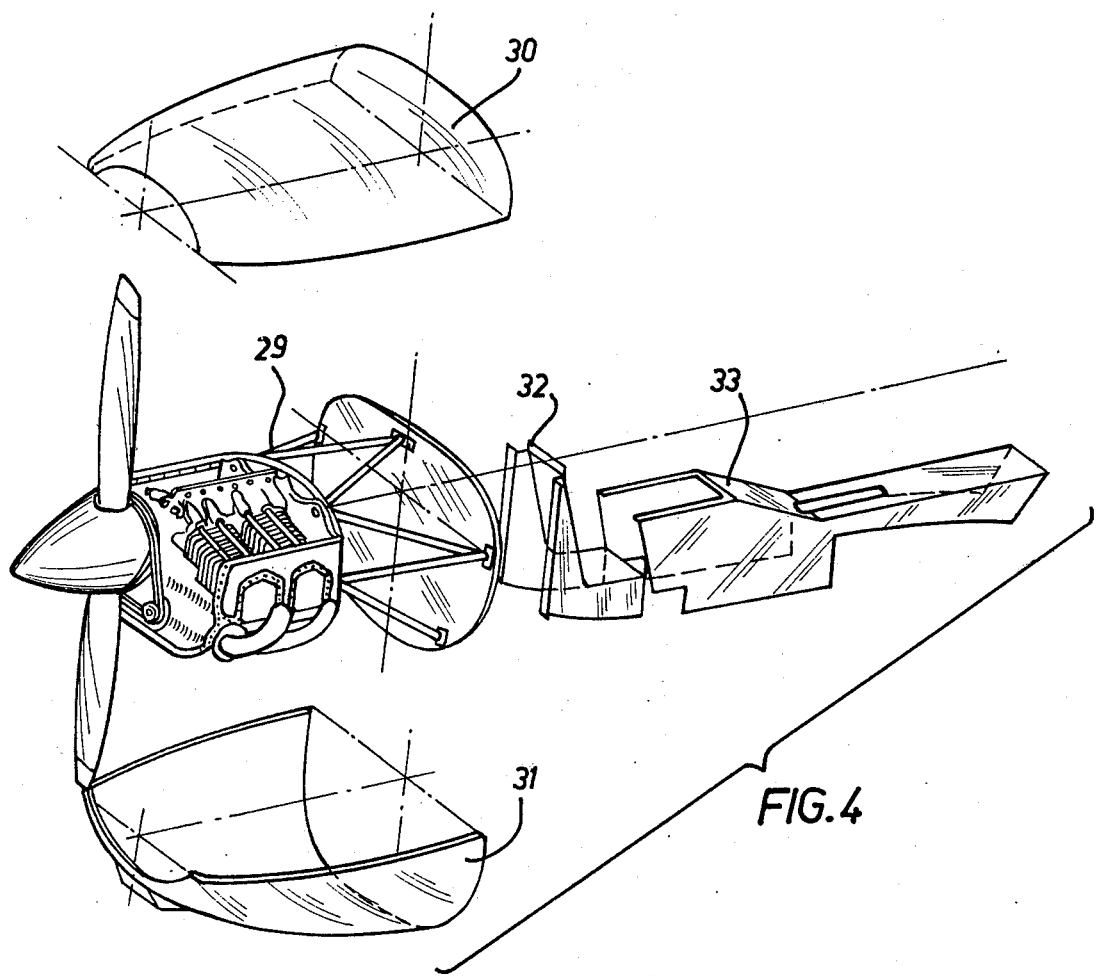
FIG. 4 is an exploded view of the nose portion of such light aircraft.

The nose portion, an exploded view of the elements of which is provided by FIG. 4, includes the powerplant 29, an upper cowling 30, a lower cowling 31, an instrument panel 32 and a console 33.

Figure 2:
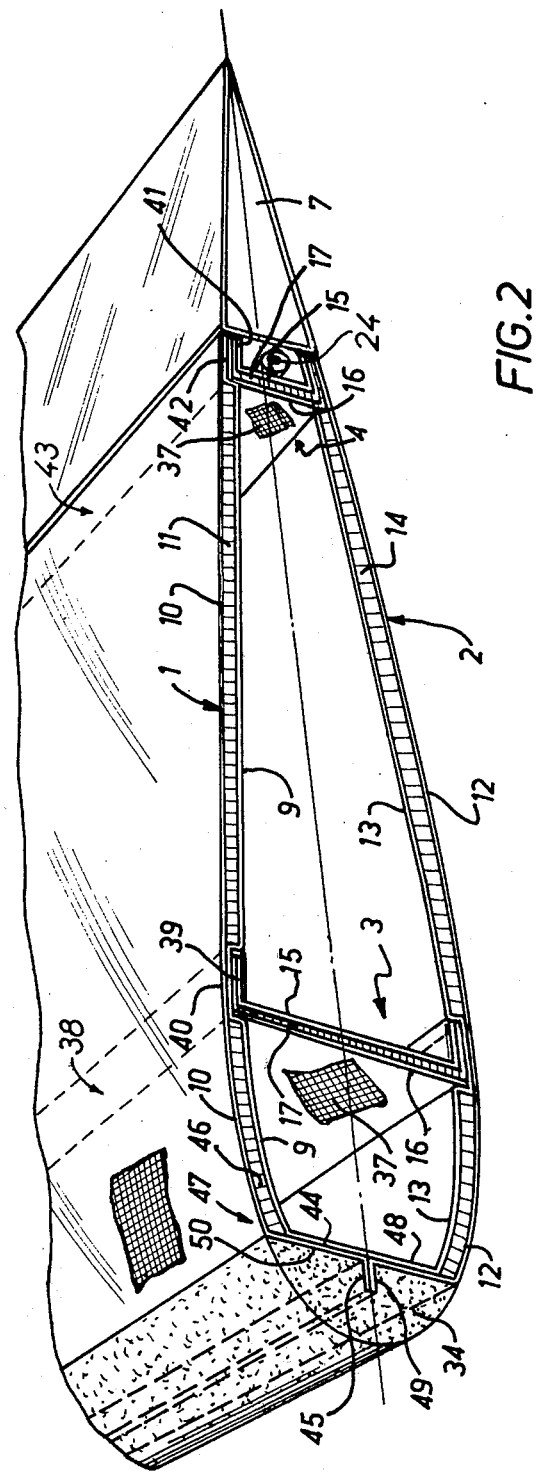
FIG. 2 is a fragmental sectional view of the component parts shown in FIG. 1, subsequent to assembly thereof.
Figure 7:
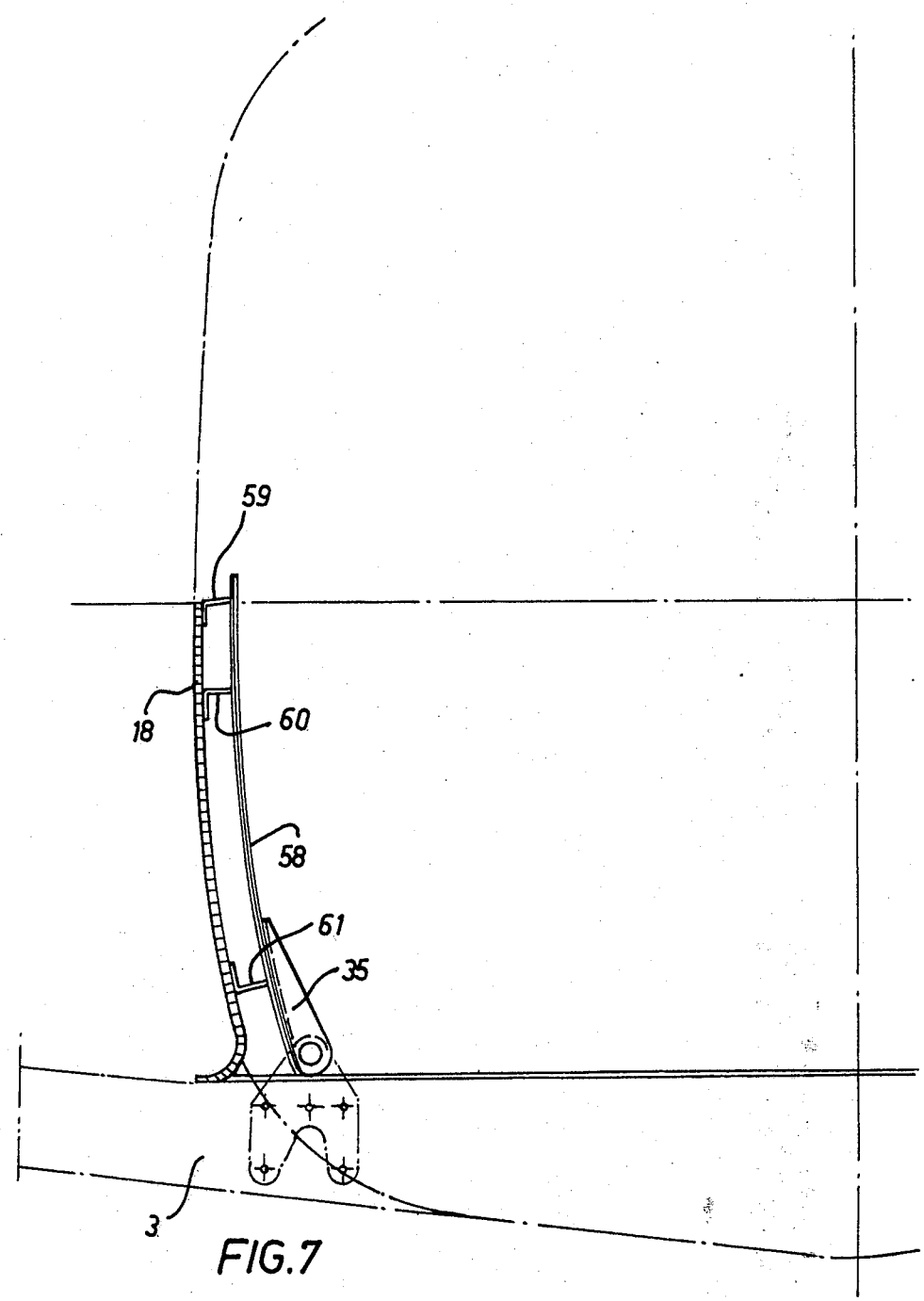
FIG. 7 is a fragmental sectional view of the fuselage portion to which the wings are joined.

As shown in FIG. 2, it is an important teaching of this invention that a profiled edging element 34 in moulded foam material of the polyurethane type, such as the material marketed under the trademark "Cadarol", is bonded astride the front joint of top and bottom panels 1 and 2 to form the wing leading edge. Reference to FIG. 7 shows fittings 35 for providing the indispensable interconnection between half-fuselage 18, say, and spar 3.

Reference is next had to FIG. 2, which is a sectional illustration of the shell-type wing structure according to this invention and which clearly shows the method of attaching spars 3 and 4 to top and bottom panels 2 and 1 and the method of joining said panels to each other (to be described in greater detail hereinafter).

FIG. 2 further illustrates the method according to this invention of attaching the moulded leading edge 34 to the joint (1, 2).

In the form of embodiment herein described, intended for a light utility aircraft, the wing elements of FIG. 1 are lined internally with a roved fabric (9, 10, 12, 13) the crossed threads of the armature 36 of which extend as shown along the longitudinal and transverse axes of the aircraft, the fabric being impregnated. The cellular cores 11 and 14 are preferably made of expanded-metal honeycomb material, an example being the material known by the trademark "Nida", or of a cellular assembly of juxtaposed and bonded cellulose acetate tubes marketed under the trademark "Tubus", or of any other convenient material. Spars 3 and 4 and ribs 5 are similarly constituted except that, as shown at 37 in FIG. 2, the armature threads of the roved fabric are inclined at 45° to the fore-aft and transverse axes of the aircraft in the corresponding plane thereof.

As shown in FIG. 2, cellular cores 11 and 17 are interrupted at the location of attachment with the fillet 38 to permit attachment of spars 3 and 4 and ribs 5 to top and bottom panels 2 and 1. The skin overlength lugs 15 and 16 of the spar, generally designated by reference numeral 3, are bonded together at 39, the skin overlength lugs 9 and 10 of the top panel are similarly bonded together at 40, and the two attachments 39 and 40 are bonded together over the entire junction area 38.

Similarly, the skin overlengths 16 and 17 of the spar, generally designated by reference numeral 4, are bonded together to form a lug 41, the skin overlengths 9 and 10 of the panel are bonded together at 42, and the assemblies 41 and 42 are bonded fast with the entire joint area generally designated by reference numeral 43. A flap 7 pivotable about hinge 24 is adapted to fit into the rear of the wing.

Likewise, the two skin overlengths 9 and 10 of top panel 1 are bonded together to form an angled lug (44, 45) whereby to enclose the edge of cellular core 46 at 47, and similarly skins 12 and 13 together form an angled lug (48, 49). The end lugs 45 and 49 are bonded together and inserted into and bonded to the expanded-foam edging 34 which has its rear surface 50 bonded to lugs 44 and 48.

Figure 6:
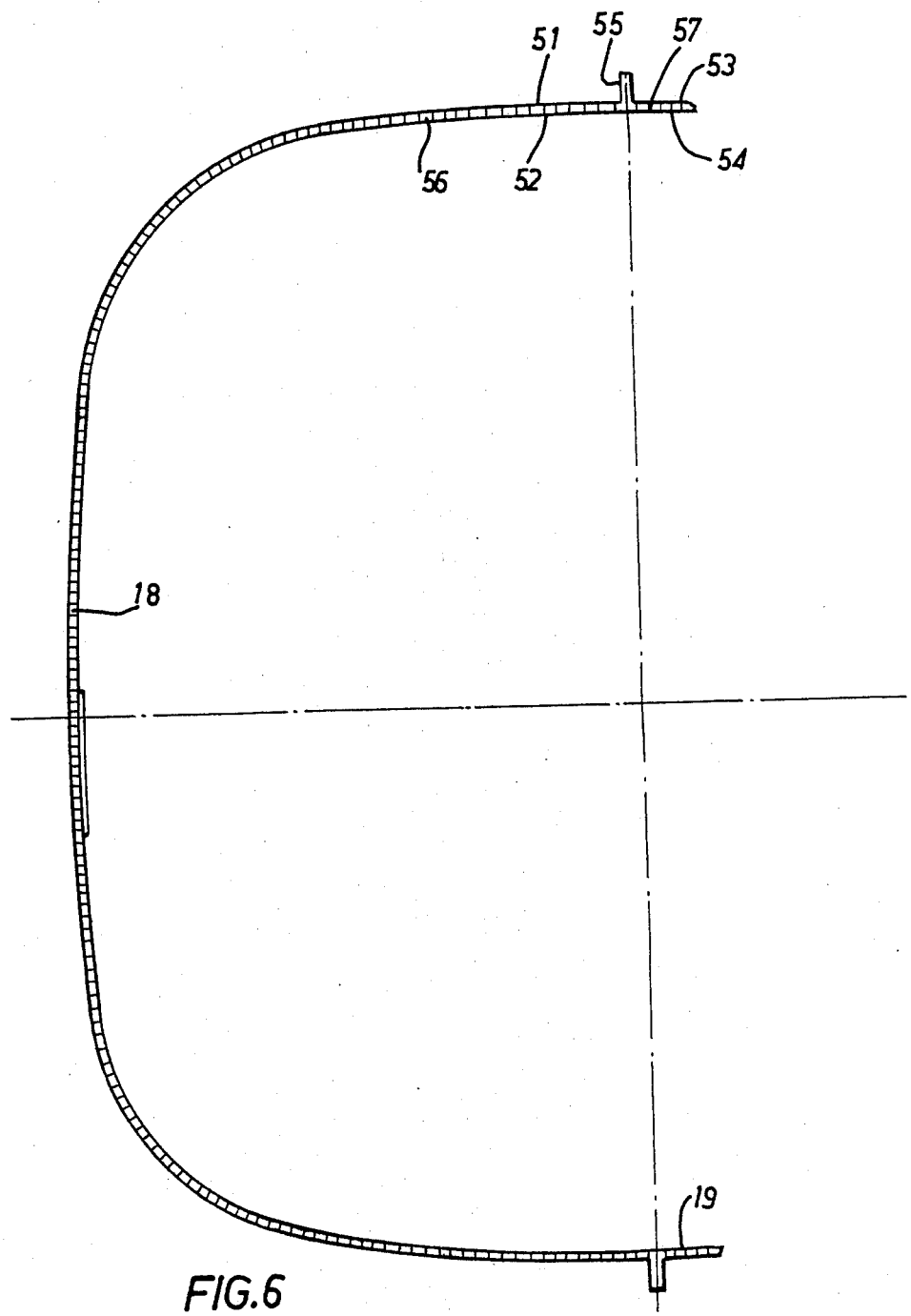
FIG. 6 is a fragmental sectional view of the middle portion of the fuselage.

Reference to FIG. 6 shows that the joints of half-shells 18 and 19 are obtained similarly by bonding the four skins 51 through 54 to form a single lug 55 at the joint line, along a symmetry plane of the shell, of the two honeycomb cores 56 and 57. It is to be noted that the armature threads of the roved shell fabrics are inclined at 45° to the corresponding fore-aft and transverse axes of the aircraft, as shown at 65.

The metal reinforcements or inserts such as the part 58 to which the fitting 35 is attached (FIG. 7) are secured by bonding at several points on the sandwich material such as at 59, 60 and 61 in order to transmit certain forces and reinforce areas that are either extensively hollowed or heavily loaded.

Figure 8:
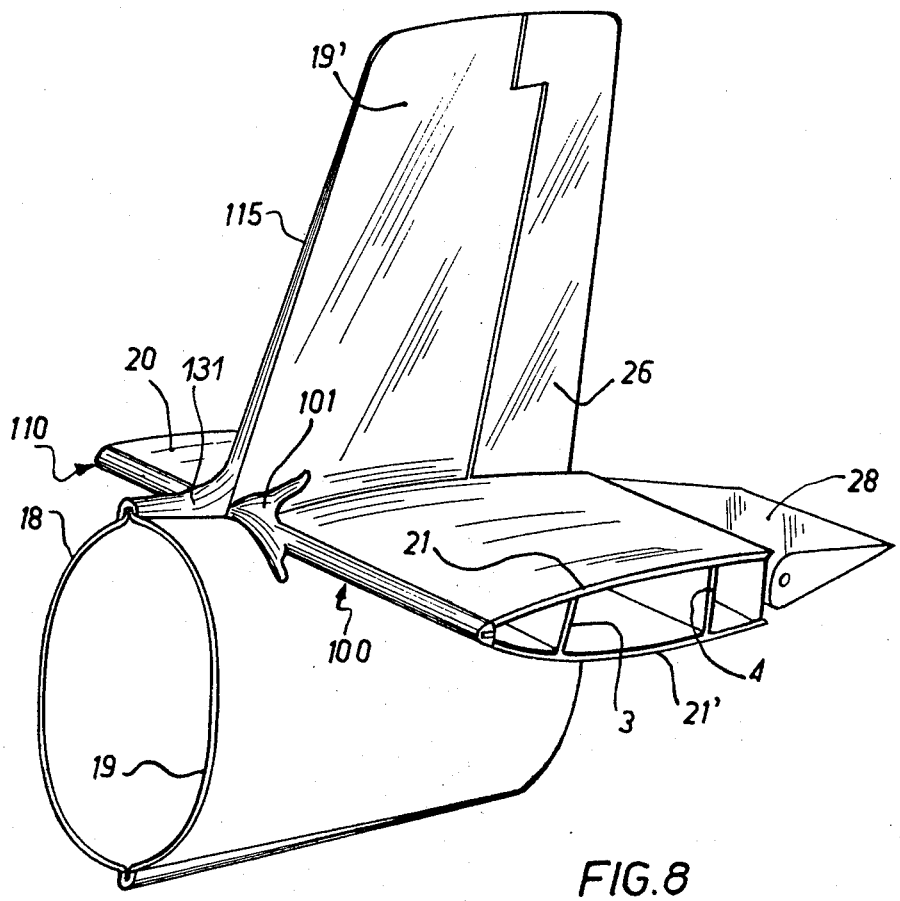
FIG. 8 is a fragmental illustration in perspective of the aft portion of a light aircraft having two fillets according to this invention fitted thereto.

FIG. 8 illustrates a more elaborate moulded edging (100) for the aft horizontal stabilizer (FIGS. 8, 9, 10 and 12). The description which follows relates to one half of this stabilizer, but it is to be understood that the other half comprises the same elements symmetrically positioned, in relation to those of the first half, with respect to the longitudinal symmetry plane of the aircraft. The two skin overlengths (120, 121) of top panel 21 (or 20) are bonded to form an angled lug (116, 117) and the skin overlengths (122, 123) of bottom panel 21' (or 20') are bonded to form an angled lug (118, 119).

The ends 117 and 119 of these lugs are bonded to each other and inserted into a groove formed in moulded edging 100 (or 110) preferably made of expanded polyurethane foam. The edging 100 is bonded to the elements 117 and 119 and also has its rear face 124 bonded to the elements 116 and 118 of the angled lugs. It forms the leading edge of each half of the aft horizontal stabilizer.

An important characteristic of this moulded edging resides in the fact that, at one end of its straight portion 100 (or 110), it comprises an element 101 (or 111) rigidly united with said straight portion and extending vertically on either side thereof.

Element 101 (or 111) is bonded to one half 19' (or 18') of the vertical stabilizer or fin and to the corresponding half 19 (or 18) of the fuselage and forms a fillet designed to prevent the formation of vortices at the point of junction of the fuselage and the horizontal stabilizer.

Figure 11:
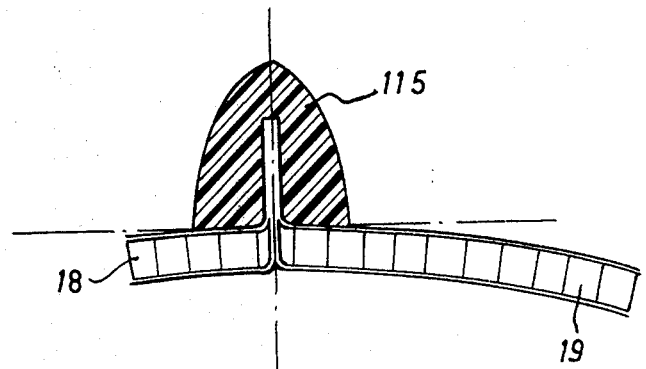
Figure 13:
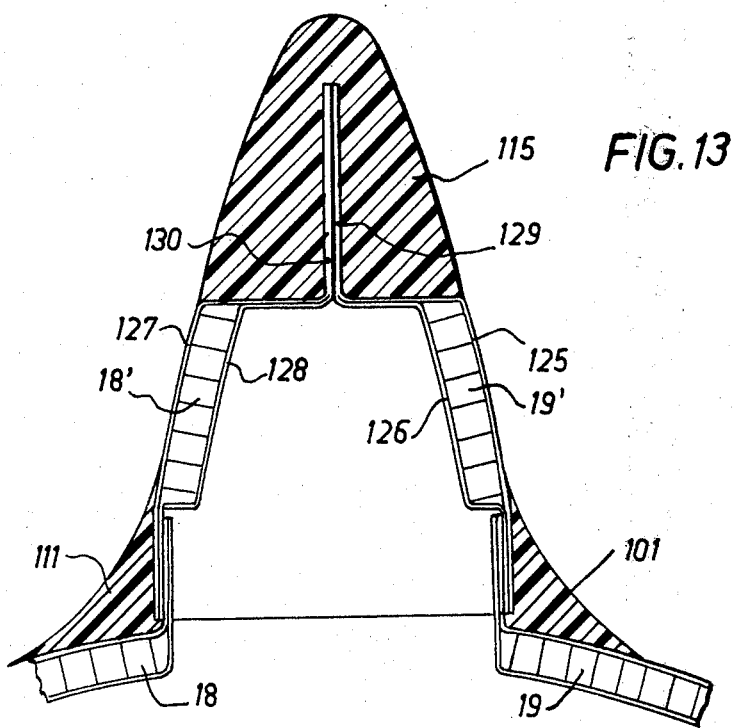

The profiled edging 115 for the vertical fin is shown in FIGS. 8, 11 and 13.

As in the case of the horizontal stabilizer, the vertical fin (19', 18') includes, along its leading edge, a first angled lug formed by two skin overlengths (125, 126) of its half 19' (see FIG. 13) and a second angled lug formed by two skin overlengths (127, 128) of its half 18', the ends (129, 130) of these two lugs being bonded together.

Profiled edging 115 is characterized by the fact that it is placed astride the two ends (129, 130) and is bonded thereto as well as to the adjacent fuselage portion (19, 18) via its element 131.

As already stated, FIGS. 10 through 13 are sections taken through FIG. 9.

Figure 10:
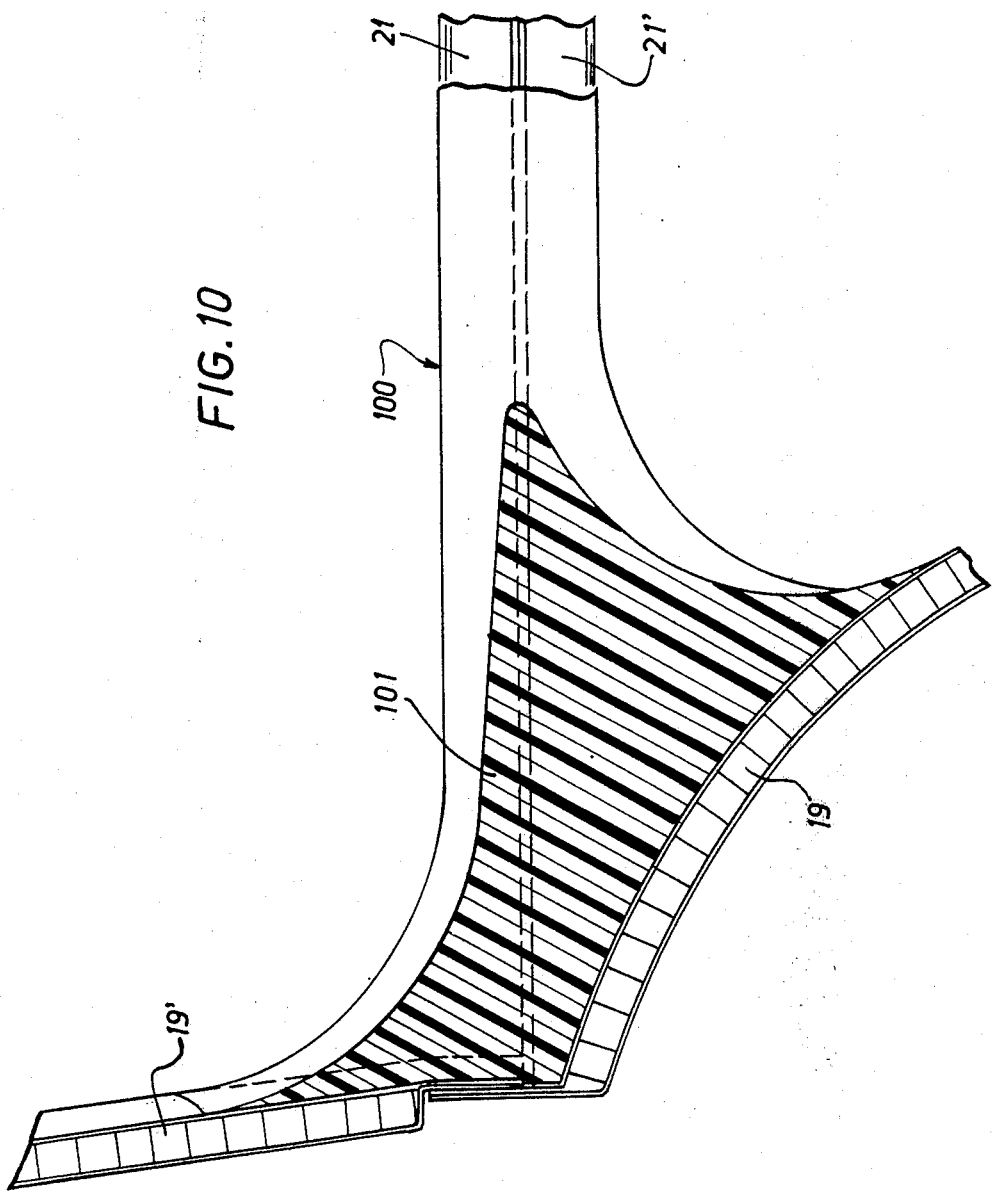
FIGS. 10 through 13 are sectional views taken through the lines X—X, XI—XI, XII—XII, and XIII—XIII of FIG. 9, respectively.

FIG. 10, which is a section through the line X—X of FIG. 9, clearly shows how the fillet 101 is bonded against the fin and fuselage surfaces 19' and 19.

FIG. 11, which is a section through the line XI—XI of FIG. 9, clearly shows how the profiled edging 115 is bonded to the mutually bonded flanges of fuselage halves 18 and 19.

Figure 12:
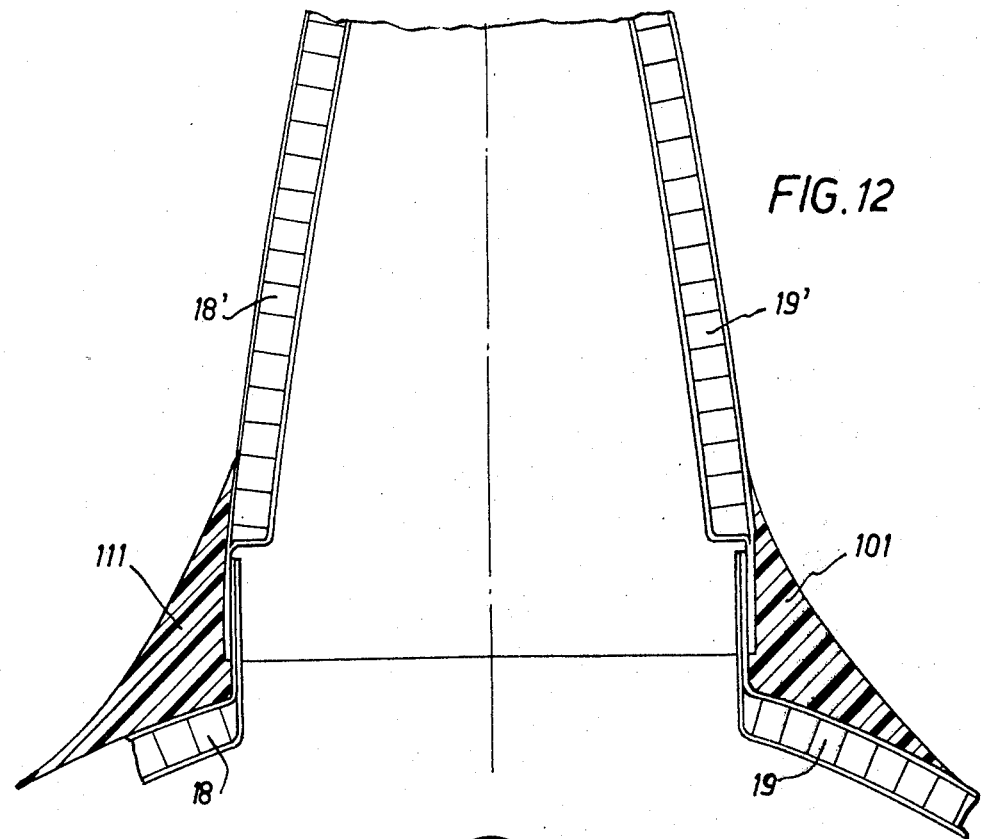

FIG. 12, which is a section through the line XII—XII of FIG. 9, shows how the fillets 101 and 111 are bonded against the respective halves of the fuselage and the vertical fin.

Lastly, FIG. 13, which is a section through the line XIII—XIII of FIG. 9, shows how the fillets 101, 111 and the profiled edging 115 are bonded.

The advantages of such a modular concept for a light aircraft structural shell stems from the fact that the basic materials employed are inexpensive and easy to use, notably for large production runs, and that the fibres in roved fabrics can be oriented to suit different stress patterns. Each subassembly can be produced from a few large homogeneous monobloc components, an example being the one-piece wing bottom panel fabricated in a series of simple operations. Further, the number of such subassemblies is reduced, thereby markedly simplifying final assembly of the aircraft.

Such a design concept ensures maximum continuity in the stressed members and a minimum of areas of concentrated stress, thus leading to a light, highly efficient structure well-suited to the materials used.

However, the modest strength characteristics of the materials used for reasons of cost and ease of manufacture pose certain problems, particularly with regard to the moduli of elasticity affecting the overall rigidity of the structure. The weakness of such materials must therefore be compensated for by stiffness-imparting means specific to the structural concept, such as can be provided by the sandwich shell structural design according to this invention. Indeed, such a design ensures a high moment of inertia for the structural members in bending and in torsion not withstanding the low permissible stress levels, as well as good overall structural rigidity.

The Applicant has in fact determined (on the basis of AIR 2052 and FAR 23 recommendations) that, in the case of a wing having an area of $10m^2$ for a span of 9m and a weight of 65kg, the top and bottom panels should preferably be made, on the one hand, with a cellular core of the kind made from the material sold under the trademark "Tubus", 12 mm deep from the aircraft axis to the outboard ribs, and from a material of the type sold under the trade name "Tubus", 6mm deep from the outboard ribs to the wingtips and, on the other, with inner and outer skins in impregnated roved fabric having a Young's modulus of elasticity of $E = 2300$ hectobars and a Coulomb torsion modulus $G = 300$ hectobars, in three thicknesses with a total thickness of 1.05mm, extending from the aircraft axis to a distance of 1.55m therefrom, followed by two layers with a total thickness of 0.7mm extending from the 1.55m point to the outboard ribs, and thereafter two layers with a total thickness of 0.4mm extending from the outboard ribs to the wingtips.

It goes without saying that changes and substitutions may be made in the preferred exemplary non-limitative embodiment hereinbefore described without departing from the scope of the invention as set forth in the appended claims.

I claim:

1. An aircraft structural element for connection to other structural elements comprising
   a first skin made of resin-preimpregnated reinforcing fabric,
   a second skin made of resin-preimpregnated reinforcing fabric,
   and a cellular core,
   said first skin, said second skin and said cellular core cured together in a mold in the ultimate shape of the structural element,
   said cellular core interrupted at zones destined to form junctions with other elements, the skins of the element at each such zone bonded together to form zones of engagement for the connecting lugs or flanges of other elements.

2. An aircraft structural part comprising
   structural elements including an upper element, a lower element, a front spar, and a rear spar,
   each of said structural elements including
   a first skin made of resin-preimpregnated reinforcing fabric,
   a second skin made of resin-preimpregnated reinforcing fabric,
   and a cellular core,
   said first skin, said second skin, and said cellular core cured together in a mold in the ultimate shape of said structural element,
   each said skin having an overlength extending beyond the periphery of said cellular core, said overlengths being bonded together to constitute connecting lugs or flanges adapted to facilitate subsequent connection by bonding with said structural elements adjacent thereto,
   said overlengths of said upper and lower elements extending relatively forwardly and rearwardly of said upper and lower elements, and said overlengths of said spars extending relatively above and below said spars,
   said overlengths extending forwardly of said upper and lower elements bonded to form a T-shaped joint,
   said overlengths extending rearward of said upper and lower elements bonded respectively to said overlengths of said rear spar extending above and below said rear spar,
   said overlengths extending above and below said front spar bonded respectively to upper and lower zones of engagement formed respectively in said upper and lower elements by interrupting said cores in said upper and lower elements at their forward portions and bonding said first and second skins to each other at such interruption in said upper and lower elements.

3. A structural part according to claim 2, characterized in that a nose-piece edging of polyurethane foam is bonded to said T-shaped joint and outer surfaces of adjacent overlengths in a position astride said T-shaped joint.

* * * * *

UNITED STATES PATENT OFFICE
CERTIFICATE OF CORRECTION

Patent No. 3,910,531         Dated  October 7, 1975

Inventor(s)   Gerard LEOMAND

It is certified that error appears in the above-identified patent and that said Letters Patent are hereby corrected as shown below:

Under Item [30] the second priority data should read:

Aug. 3, 1975         France............73.28582

Signed and Sealed this first Day of June 1976

[SEAL]

Attest:

RUTH C. MASON
Attesting Officer

C. MARSHALL DANN
Commissioner of Patents and Trademarks